United States Patent [19]

Oka et al.

[11] Patent Number: 5,463,602
[45] Date of Patent: Oct. 31, 1995

[54] REPRODUCING APPARATUS WHICH CAN PLAY MULTIPLE TYPES OF DISCS AND BIASES FOCUSING ERROR SIGNAL BASED ON DISC TYPE

[75] Inventors: Nobuyuki Oka; Toshio Sato, both of Kanagawa; Masayuki Mizuki, Tokyo, all of Japan

[73] Assignee: Sony Corporation, Tokyo, Japan

[21] Appl. No.: 373,481

[22] Filed: Jan. 17, 1995

Related U.S. Application Data

[63] Continuation of Ser. No. 98,966, Jul. 28, 1993, abandoned.

[30] Foreign Application Priority Data

Aug. 4, 1992 [JP] Japan ..................................... 4-228006

[51] Int. Cl.⁶ ......................................................... G11B 7/00
[52] U.S. Cl. ..................................... 369/44.29; 369/44.35; 369/58
[58] Field of Search .............................. 369/44.29, 44.35, 369/44.32, 44.36, 44.27, 54, 58, 47

[56] References Cited

U.S. PATENT DOCUMENTS

| | | | |
|---|---|---|---|
| 4,512,003 | 4/1985 | Kimura et al. | |
| 4,707,648 | 11/1987 | Minami | 369/44.35 |
| 4,769,801 | 9/1988 | Funada et al. | 369/44.29 |
| 4,890,274 | 12/1989 | Kaneko et al. | 369/44.35 |
| 5,003,521 | 3/1991 | Yoshida et al. | 369/44.27 |
| 5,173,886 | 12/1992 | Satoh et al. | 369/44.29 |
| 5,177,726 | 1/1993 | Terada | 369/44.27 |
| 5,289,451 | 2/1994 | Ashinuma et al. | 369/44.29 |

FOREIGN PATENT DOCUMENTS

| | | | |
|---|---|---|---|
| 0423731A3 | 10/1990 | European Pat. Off. | G11B 7/085 |
| 3612829A1 | 4/1986 | Germany | G11B 7/135 |

*Primary Examiner*—Georgia Y. Epps
*Assistant Examiner*—P. W. Huber
*Attorney, Agent, or Firm*—Alan S. Hodes; Limbach & Limbach

[57] ABSTRACT

An optical disc reproducing apparatus can play multiple types of discs. The apparatus biases a focusing error signal based on the disc type. An analyzer receives reflected light of a light beam irradiated from an optical pick-up to a disc. A focus error signal is generated based on the signal supplied the analyzer. A switch selectively provides one of first and second bias voltages. A control controls which of the first and second bias voltages the switch provides based on the type of disc. The bias voltage is added to the focus error signal. An object lens of the optical pickup is driven based on the focus error signal with the bias voltage added.

3 Claims, 8 Drawing Sheets

REPRODUCING APPARATUS WHICH CAN PLAY MULTIPLE TYPES OF DISCS AND BIASES FOCUSING ERROR SIGNAL BASED ON DISC TYPE

This is a continuation of application Ser. No. 08/098,966, filed on Jul. 28, 1993, now abandoned.

BACKGROUND OF THE INVENTION

1. Field of the Invention

The present invention relates to a reproducing apparatus which can play multiple types of discs and more particularly, an apparatus which biases a focusing error signal based on the disc type.

2. Description of the Related Art

In an optical disc apparatus such as a compact disc player, like the apparatus disclosed in U.S. Pat. No. 4,512,003, reflected light obtained from a compact disc is received, and a focus error signal is generated to focus-control on the basis of the focus error signal.

Figure 1:
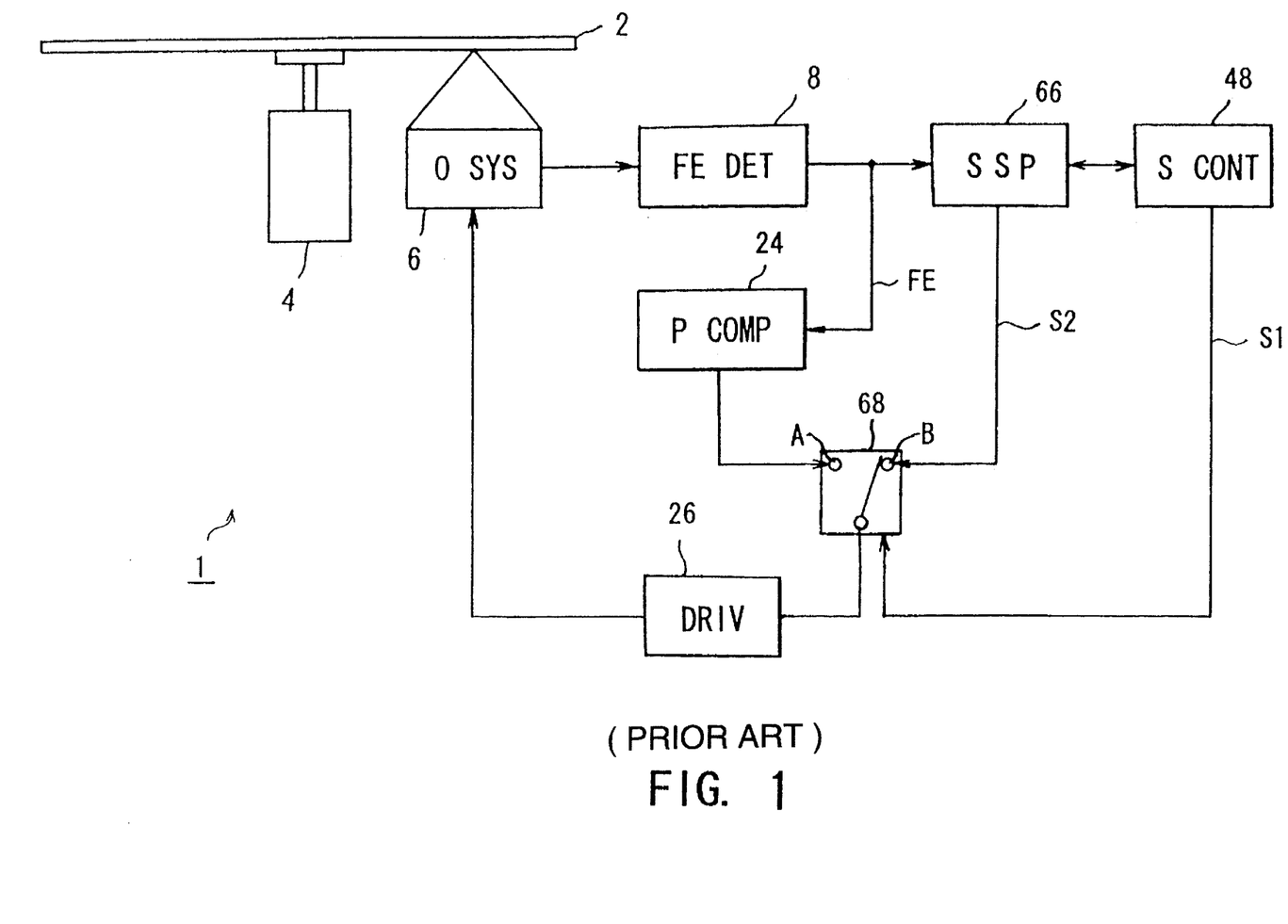
FIG. 1 is a block diagram showing a conventional construction.

Specifically, as shown in FIG. 1, in an optical disc apparatus 1, an optical disc 2 is rotated by a spindle motor 4, and a light beam emitted from the optical apparatus of an optical pick-up 6 radiates onto the optical disc 2.

The light beam is reflected from the optical disc 2 and received by an optical system 6. An output signal from the optical system 6 is outputted to a focus error detecting circuit 8.

Figure 2:
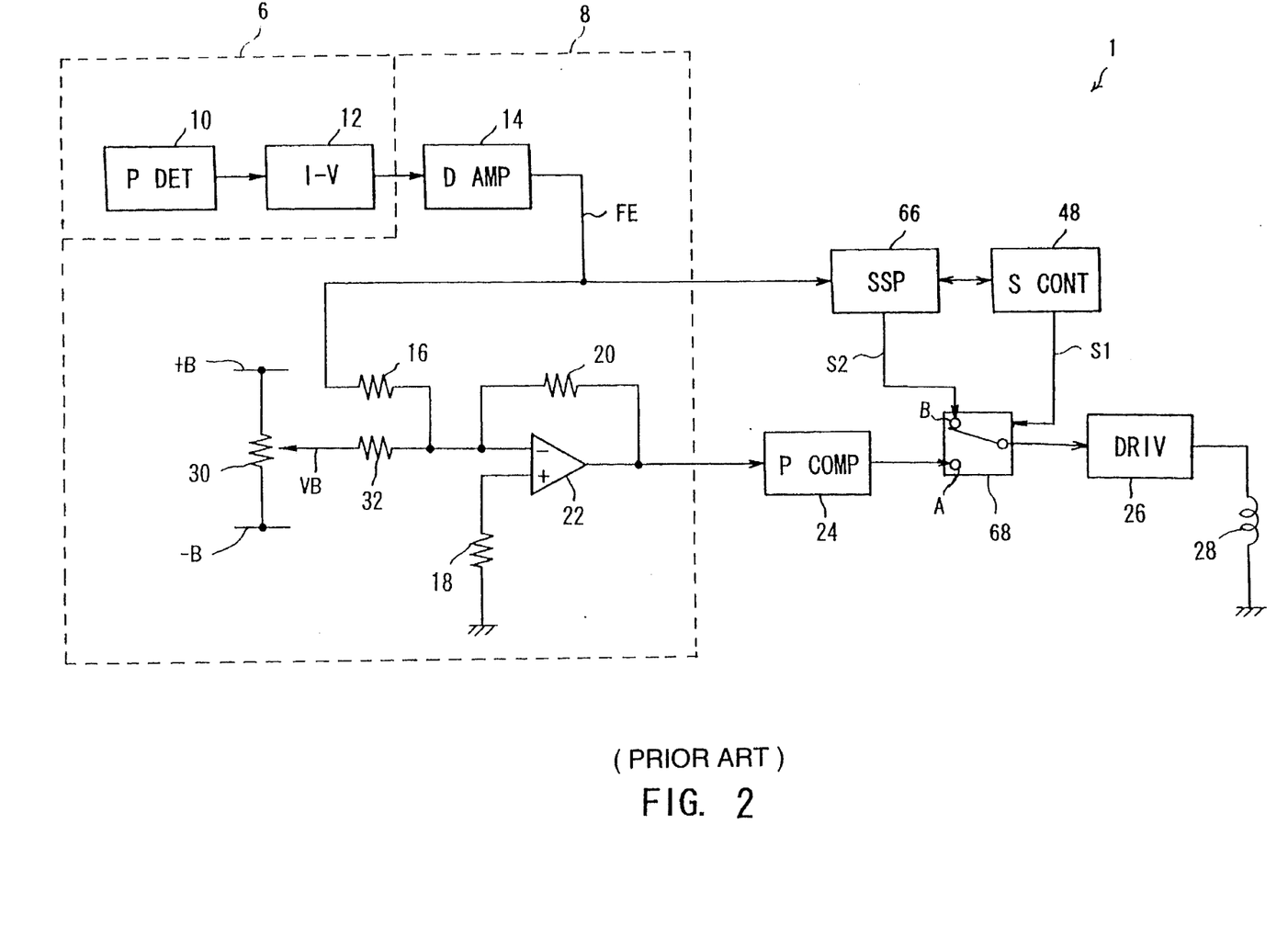
FIG. 2 is a block diagram showing a conventional optical disc apparatus.

As shown in FIG. 2, in the optical disc apparatus 1, the reflected light beam from the optical disc 2 is received by a photo detector 10 via a cylindrical lens, wherein the defocusing amount of the reflected light beam is detected by using a so-called astigmatism method.

To be specific, in the photo detector 10, a light receiving plane is divided into two toward the radial direction of the optical disc 2, and moreover, is divided into two toward the direction orthogonal with the radial direction of the optical disc 2. The focus error detecting circuit 8 Current-Voltage transforms the output current of each light receiving plane by a current-voltage transform circuit 12, and then outputs it to a differential amplifier circuit 14.

Figure 3:
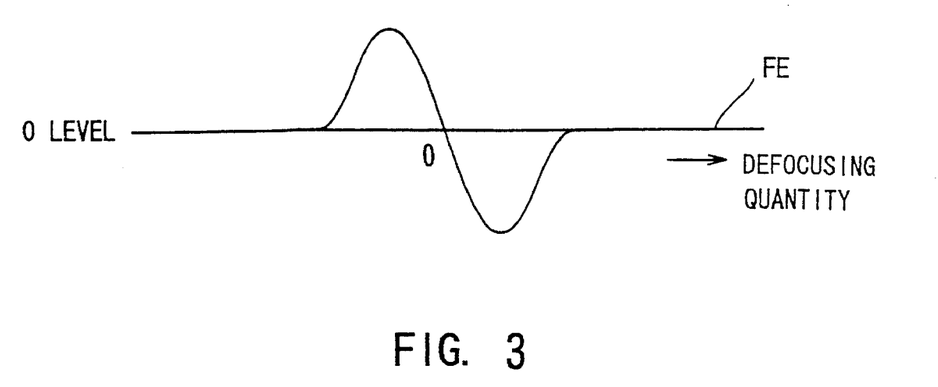
FIG. 3 is a signal waveform chart showing the focus error signal thereof.

The differential amplifier circuit 14 adds the output signals of the light receiving planes positioning toward the direction of a diagonal line. Thereafter, a differential signal is generated between the respective added signals. Therefore, as shown in FIG. 3, a focus error signal FE is generated such that the signal level changes in an "S" shape in accordance with the defocusing quantity.

Before focus searching is complete, a system control circuit 48 controls a switching circuit 68 by a control signal S1 to switch to B side, and thereafter a SSP (signal servo control processor) 66 generates a focus search voltage signal S2. Then, the object lens moves up and down via a drive circuit 26 and a focus lens actuator 28 responsive to the focus search voltage signal S2. When the object lens comes up to the disc 2, a "S" shape signal is obtained as shown in FIG. 3, and the SSP 66 controls the selecting circuit 68 in order to switch from B side to A side when the coincident point near "0", which is the center of the "S" shape in FIG. 3, is detected. With this, focus searching is complete.

When the focus searching is complete, the focus error detecting circuit 8 inputs this focus error signal FE to an operational amplifier circuit 22 composed of an inverting amplifier circuit, which has an input resistor 16, a grounding resistor 18 and a feed-back resistor 20, and outputs the output signal of the operational amplifier circuit 22 to a phase compensating circuit 24.

The phase compensating circuit 24 compensates the phase of the focus error signal FE and outputs it, and the drive circuit 26 drives a focus lens actuator 28 in accordance with the output signal of the operational amplifier circuit 22.

Hence, the focus error detecting circuit 8 moves the object lens up and down in order that the signal level of the focus error signal FE becomes "0" level, so that the defocusing quantity is kept to "0".

Because dispersion or astigmatism cannot be prevented in the optical system or the like, in this type of optical pick-up, a predetermined bias voltage is added to the focus error signal FE and this bias voltage is adjusted so as to focus-adjust.

That is, the focus error detecting circuit 8 has a variable resistor 30 connected between a positive power source +B and a negative power source −B, and a bias voltage VB formed by this variable resistor 30 is input to the operational amplifier circuit 22.

In this way, in the optical disc apparatus 1, the dispersion, etc., of the optical system can be corrected for by adjusting this variable resistor 30.

However, some types of optical disc apparatuses enable not only the playing-back of a compact disc having pits and lands but also the recording and playing-back of information to and from magneto-optical disc having pre-cut wobbling grooves and lands.

Figure 4:
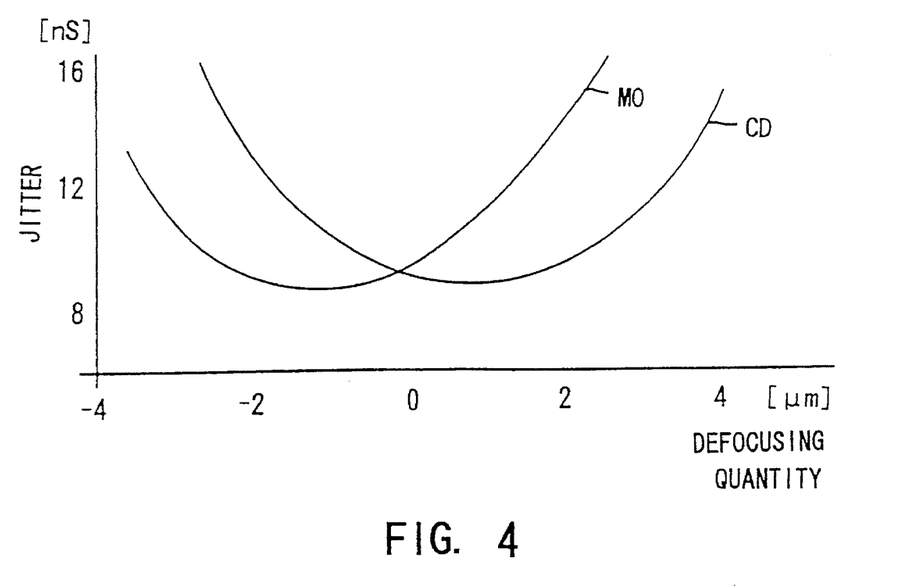
FIG. 4 is a characteristic curve diagram representing the relationship between the focus error signal and the jitter.

In this type of optical disc apparatus, when the value of the bias voltage VB is changed slowly and the jitter is detected, as shown in FIG. 4, it is recognized that the focus position having the smallest jitter is not the for a compact disc (represented by the character "CD") as for a magneto-optical disc (represented by the character "MO").

In the conventional optical disc player, the bias voltage is fixed and is not changeable in accordance with the recording medium. For example, in FIG. 4, the bias voltage VB is adjusted to the range in which the characteristics of the jitter of both MO and CD is acceptable (the defocusing quantity is near "0").

However, since the fixed bias voltage differs slightly from the optimum value of the jitter for each disc, where there are flaws or fingerprints on the disc, the sound may jump easily.

Furthermore, the bit error rate changes with jitter. In this type of fixed-jitter optical disc system, the bit error ratio cannot be improved by adjusting the jitter.

SUMMARY OF THE INVENTION

In view of the foregoing, an object of this invention is to provide a focus bias switching circuit which adjusts to the optimum focus position for each of two recording media.

The foregoing object and other objects of the invention have been achieved by the provision of an optical disc apparatus in which an optical disc 2A and a magneto-optical disc 2B are kept to be exchangeable, and a light beam emitted from an optical pick-up is focused to the optical disc 2A or the magneto-optical disc 2B to reproduce the recorded data of the optical disc 2A or the magneto-optical disc 2B. The optical disc apparatus 40 comprises means for generating focus error signal 10, 12 and 14 for receiving the reflected light of the light beam obtained from the optical disc 2A and the magneto-optical disc 2B and for generating a focus error signal FE, a means for correcting focus error signal 16 through 22, 32 and 42 through 52 for adding a non-zero bias voltage VB to the focus error signal FE and for correcting the signal level of the focus error signal FE, and focus driving means 24, 26 and 28 for adjusting the focus position of the light beam based on the focus error signal FE corrected by the means for correcting focus error signal 16 through 22, 32 and 42 through 52. The disc judgement means 70 judges whether the set disc is the optical disc 2A or the magneto-optical disc 2B, and then the means for correcting focus error signal 16 through 22, 32 and 42 through 52 selects the bias voltage VB accordingly.

Further, the present invention provides an optical disc apparatus 40 in which the light beam emitted from the optical pick-up is focused to the disc to reproduce the recorded data of the optical disc 2A, and moreover the data is recorded in the magneto-optical disc 2B and the recorded data is produced. The optical disc apparatus 40 comprises the means for generating focus error signal 10, 12 and 14 for receiving the reflected light of the light beam obtained from the disc and for generating a focus error signal FE, a means for correcting focus error signal 16 through 22, 32 and 42 through 52 for adding the non-zero bias voltage VB to the focus error signal FE and for correcting the signal level of the focus error signal FE, and a focus driving means 24, 26 and 28 for adjusting the focus position of the light beam based on the focus error signal FE corrected by the means for correcting focus error signal 16 through 22, 32 and 42 through 52. In the case that a composite disc 2C, having the inner periphery area in which the predetermined data is previously recorded by forming pits and the outer periphery area in which the magneto recording area is formed and the desired data can be thermo-magnetically recorded, is set at the optical disc apparatus 1, the disc judgement means 70 judges the type of disc, and the means for correcting focus error signal 16 through 22, 32 and 42 through 52 selects the non-zero bias voltage VB in accordance with the area of inner periphery side and outer periphery side.

Furthermore, in the present invention, the means for correcting focus error signal 16 through 22, 32 and 42 through 52 adds the bias voltage VB on the focus error signal FE via a predetermined time constant circuit 32, 50 and 52.

By selecting the bias voltage VB to correct the area of signal level of the focus error signal FE between the optical disc 2A and the magneto-optical disc 2B, the optimum focus position can be adjusted for the optical disc 2 and the magneto-optical disc.

Further, by switching the bias voltage VB between the area of the inner periphery side and the area of the outer periphery side, it is adjusted to the optimum focus position for the respective areas of the inner and outer periphery sides.

The bias voltage VB is added on the focus error signal FE via the predetermined time constant circuits 32, 50 and 52 so that the defocusing can be prevented.

According to the present invention, the bias voltage is switched between the optical disc and the magneto-optical disc, and the signal level of the focus error signal is corrected, so that the optical disc system, which can adjust to the optimum focus position for each recording medium, can be obtained.

The nature, principle and utility of the invention will become more apparent from the following detailed description when read in conjunction with the accompanying drawings in which like parts are designated by like reference numerals or characters.

DETAILED DESCRIPTION OF THE INVENTION

Preferred embodiments of the present invention will be described with reference to the accompanying drawings:

(1) First embodiment

Figure 5:
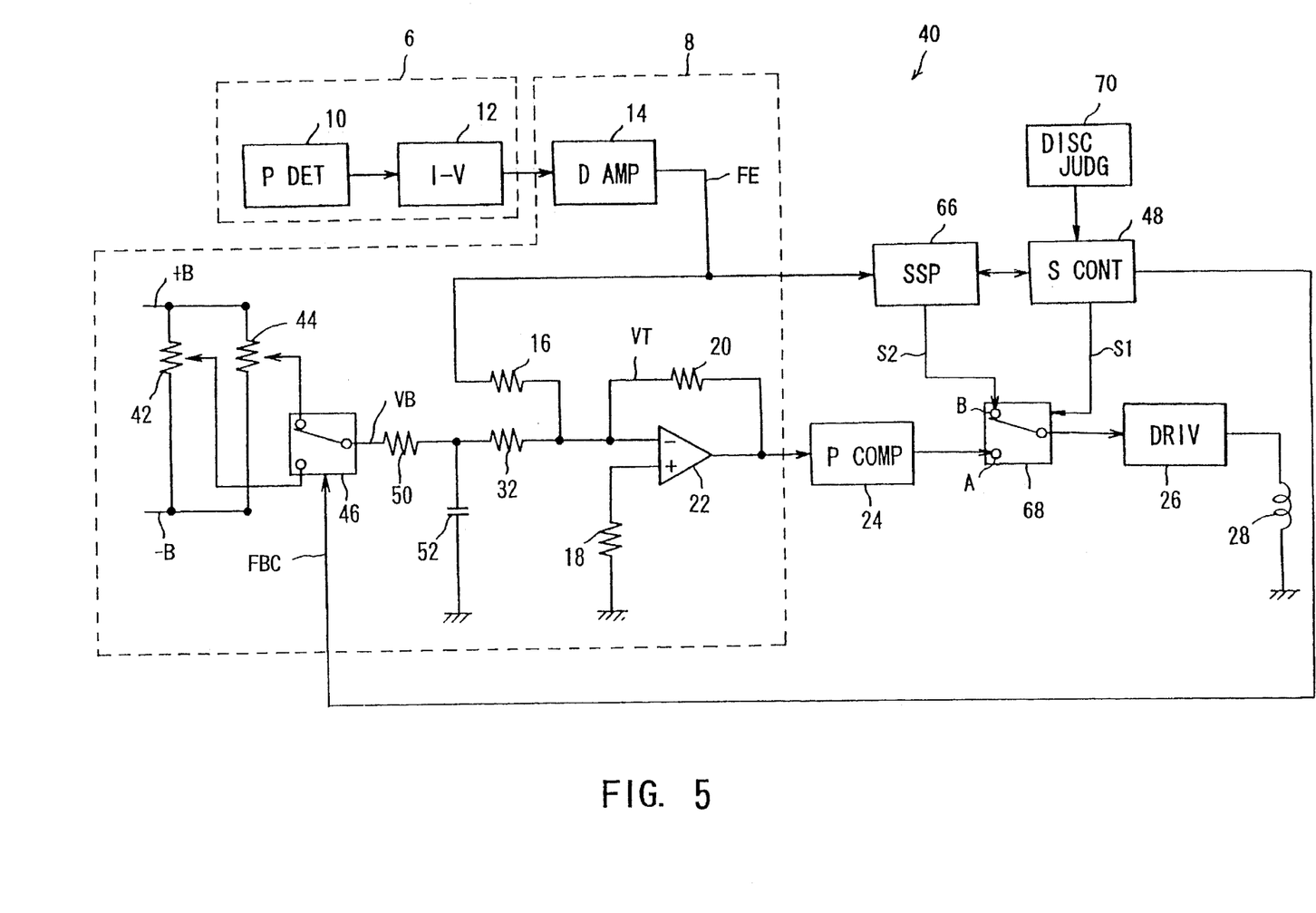
FIG. 5 is a block diagram showing an optical disc apparatus according to first and embodiment of the present invention.

Referring to FIG. 5, wherein the portions corresponding to those of FIG. 1 are designated with the same reference numerals or characters, 40 denotes an entire optical disc apparatus. The bias voltage VB is switched in accordance with the type of disc 2.

Figure 8:
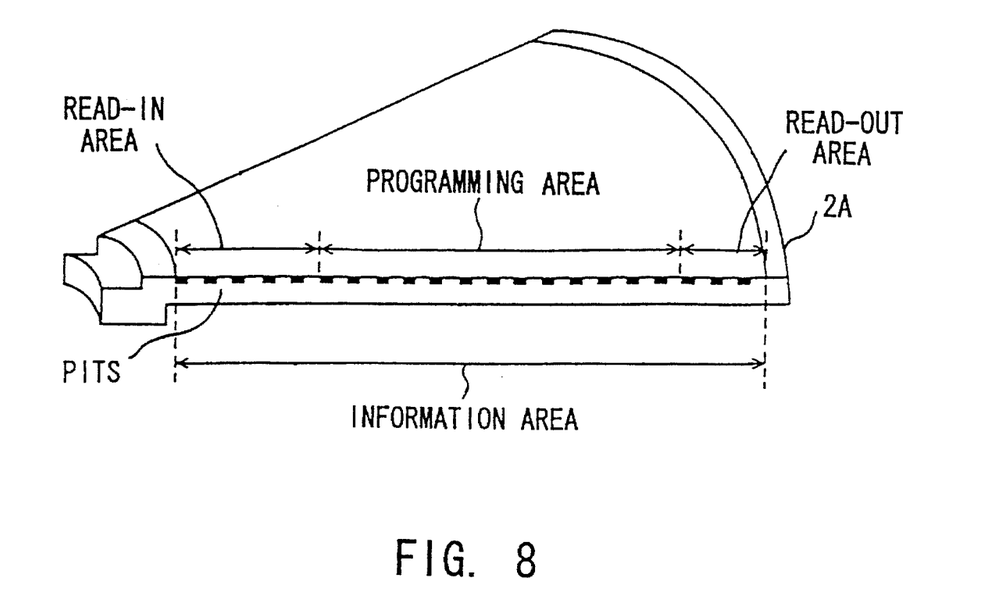
FIG. 8 is a sectional view of the optical disc having a programming area of pits.

In the optical disc apparatus 40, the optical disc 2A or the magneto-optical disc 2B are exchangeable. The optical disc apparatus 40 can reproduce from the optical disc 2A having pits, while the desired information can be recorded and reproduced by using the magneto-optical disc in which the weaving grooves are pre-cut. A sectional view of the optical disc 2A is shown in FIG. 8.

A laser light is irradiated from the optical pickup to the recording medium surface of the magneto-optical disc 2B (FIG. 9) with increased laser power. When the temperature exceeds the Curie temperature (approximately, 180 degrees Centigrade), the polarity magnetized in the recording medium is lost, and if the magnetic field is made at the moment when the temperature drops from the Curie temperature, the recording medium is magnetized.

The reproducing method of the magneto-optical disc 2B uses the characteristic (which is generally called as Kerr effect) that when the weak laser light is irradiated to a MO film, the deflection angle of the reflected light changes in response to the polarity, whether N-pole or S-pole. The reflected light is passed through an analyzer so that the polarity of the deflection angle is converted into the intensity of the light to reproduce.

Figure 9:
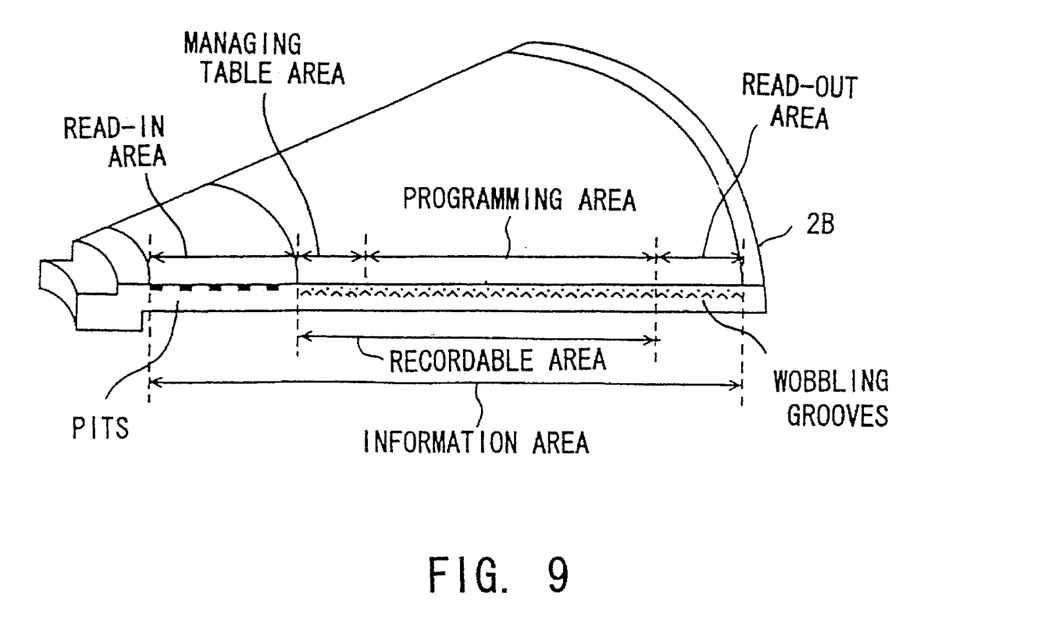
FIG. 9 is a sectional view of the magneto-optical disc having a programming area of grooves.

The magneto-optical disc 2B has a first area for producing pits, only in the innermost periphery side, and a second area with wobbling grooves for recording in the outer area from the innermost periphery side. A sectional view of the magneto-optical disc 2B is shown in FIG. 9. The information of, for instance, the type of disc have been recorded in the first area of the magneto-optical disc 2B, and the data recorded in the second area is based on the information of the first area. The optical disc apparatus 40 switches the bias voltage VB in order to correspond to these two types of disc.

Specifically, in the optical disc apparatus 40, as shown in FIG. 5, two variable resistors 42 and 44 are connected to the positive and negative power sources +B and −B, and first and second bias voltages are formed by the respective variable resistors 42 and 44.

Further, in the optical disc apparatus 40, the first and second bias voltages are outputted to a selection circuit 46, and the disc judgement means 70 judges whether the set disc is an optical disc 2A or a magneto-optical disc 2B. Then, a system control circuit 48 outputs the switching signal FBC on the basis of the judged result, so that the first and second bias voltages are selected and outputted. It is conceived that the refractive index of the surface of disc or the data (in this case, the identification code is recorded previously on the disc) recorded on the disc, or identification holes spotted on a cartridge can be used by the judgement means 70 to judge the type of disc.

To be specific, in the optical disc apparatus 40, by switching the contact point between the optical disc and the magneto-optical disc 2B, the bias voltage VB to be outputted to a operational amplifier circuit 22 is switched in accordance with the type of disc.

Therefore, in the optical disc system 40, the variable resistors 42 and 44 are adjusted to the optical disc 2A and the magneto-optical disc 2B, respectively, of which the optical characteristic is supposed to be standard so as to adjust the focus position to the optimum position respectively for the optical disc 2A and magneto-optical disc 2B. Thus, the recorded data is reproduced with a reduced bit error rate.

(2) Second embodiment

Figure 10:
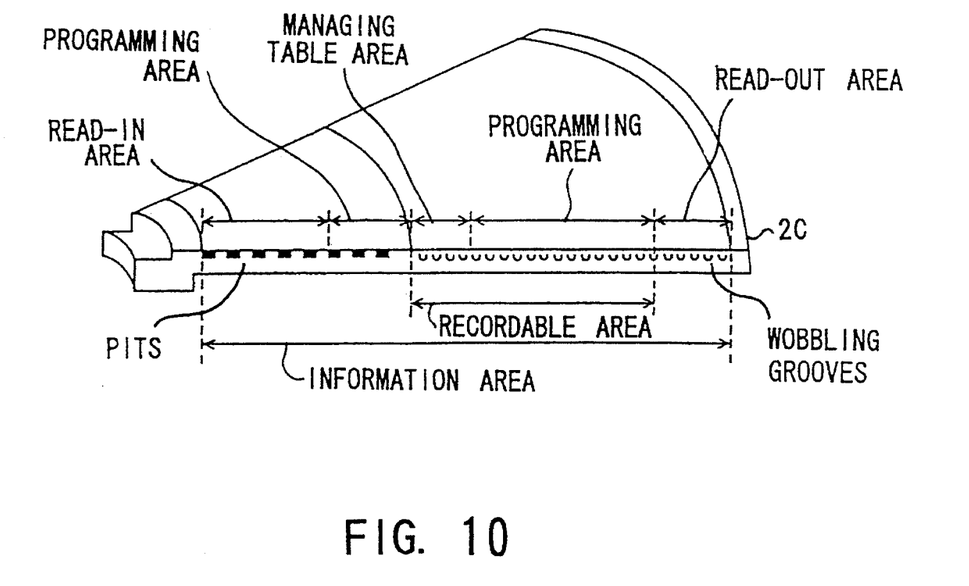
FIG. 10 is a sectional view of the composite disc having a first area with a programming area of pits and a second area with a programming area of grooves.

In addition to the optical disc 2A of which programming area is composed of pits and the magneto-optical disc 2B of which the programming area is composed of wobbling grooves, a composite disc, composed of the first programming area with pits on one disc for a reproducing operation only, and a second programming area with wobbling grooves for both a record and reproducing operation, is provided. A sectional view of the composite disc 2C is shown in FIG. 10. In the case of the composite disc, the optical disc apparatus 40 switches the contact point of the selection circuit 46 between the first area and the second area to switch the bias voltage outputted to the operational amplifier circuit 22 for each area.

In this manner, in the optical disc system 40, the optimum focus position can be obtained for each area, and the recorded data can be reproduced with a reduced bit error rate.

Further, the magneto-optical disc 2B has a pit area and groove area, and the difference between the magneto-optical disc 2B and the composite disc 2C is only one point in which the pit area is used for only a read-in area in the magneto-optical disc 2B, and is used for the read-in area and the programming area in the composite disc 2C. In the first embodiment, the bias is not switched between the read-in area with pits and a recordable area with grooves in the magneto-optical disc 2B, but the bias may be switched such like the composite disc 2C.

Further, in this embodiment, the optical disc apparatus 40 outputs the output signal of the selection circuit 46 to the operational amplifier circuit 22 via the time constant circuit consisting of the resistors 32 and 50 and a capacitor 52. This enables the voltage inputted to the operational amplifier circuit 22 to change slowly.

Figures 7A, 7B, 7C:
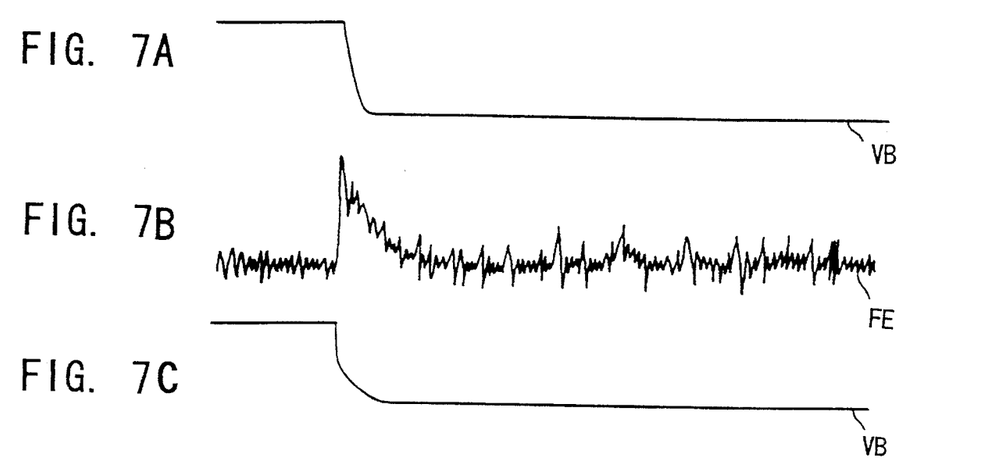
FIGS. 7A to 7E are signal waveform charts for the explanation of the operation thereof.

Specifically, as shown in FIG. 7A to 7E, when the time constant circuit is omitted, the bias voltage VB changes suddenly (FIG. 7A) following the switching of contact point of the selecting circuit 62. In this case, in the optical disc apparatus 60, the signal level of the focus error signal FE changes suddenly (FIG. 7B).

That is, in this type of optical disc apparatus 60, if the bias voltage is switched suddenly, it may enter a defocusing state. In this case, it can not be focus-controlled correctly unless it is focus-searched again.

Therefore, if the defocusing occurs frequently when the composite disc 2C is recorded and playedback, in the optical disc system 40, it is necessary to focus-search every time the area is switched between the inner and outer periphery side, and there is a downside that the access time lengthens.

Figure 7D:
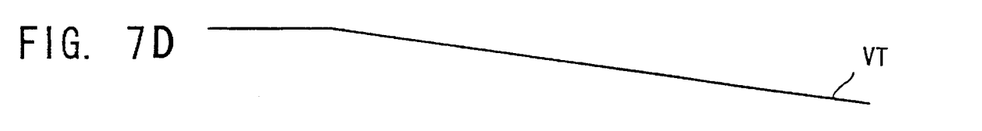
Figure 7E:
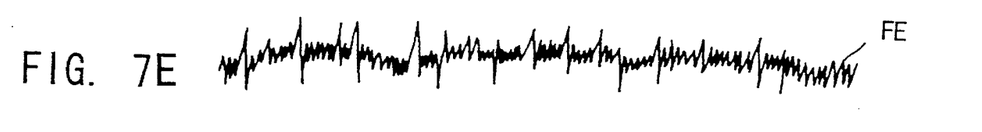

In the optical disc system 60 of this embodiment, however, the output signal of the selection circuit 62 is outputted to the operational amplifier circuit 22 via the time constant circuit so that the sudden change of the bias voltage VB can be prevented (FIG. 7C), and the input voltage VT of the operational amplifier circuit 22 can rise slowly (FIG. 7D).

In this manner, in the optical disc system 60, the sudden change of the focus error can be prevented (FIG. 7E) and thus defocusing can be prevented.

With the above constitution, the bias voltage VT is switched between the magneto-optical disc 2B and the composite disc 2C so that the optimum position can be obtained respectively for the composite disc 2C and magneto-optical disc 2B. This makes it possible to play-back the recording data with a reduced bit error rate.

(3) Third embodiment

Figure 6:
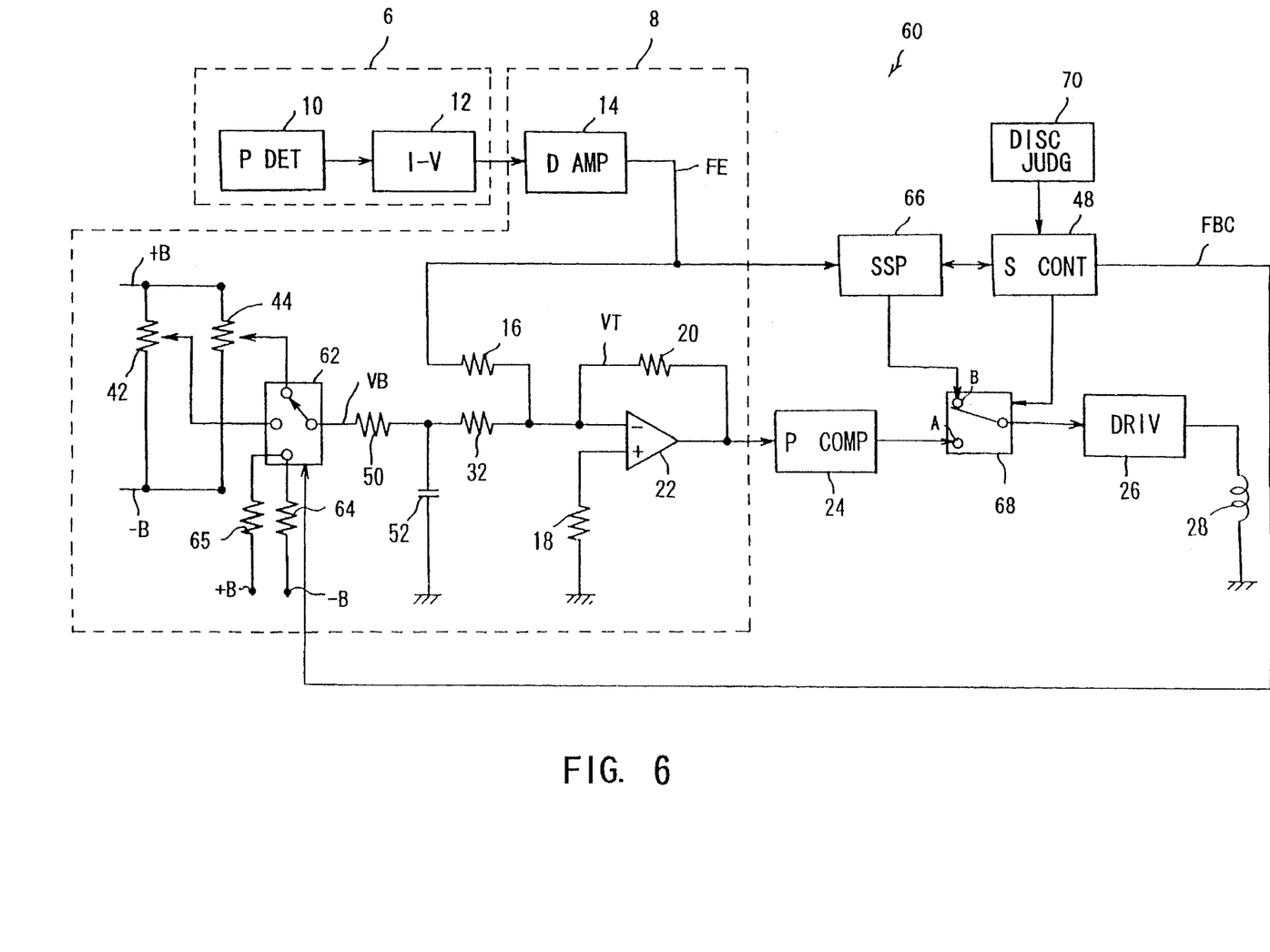
FIG. 6 is a block diagram showing the optical disc apparatus according to second embodiment of the present invention.

In FIG. 6, 60 shows the optical disc system according to a third embodiment of the invention, wherein the bias voltage VB is switched by the selection circuit 62, and at the same time, the resistor 64 is selected and the output voltage of the selection circuit 62 is kept to "0" level.

Specifically, in this type of optical disc apparatus, when the optical disc 2A is exchanged, after the object glass is moved near the optical disc, the object glass goes farther from the optical disc 2 gradually while the focus error signal FE is monitored. This enables it to detect the position of "0" level which is the center of the "S" letter characteristic of the focus error signal FE.

Therefore, in the optical disc apparatus 60, the focus control operation is started in this center position so as to focus-control certainly.

However, in this focus searching, if the focus error signal FE is biased with a high bias voltage, there is a case that the correct center position can not be detected.

For this reason, the optical disc system 60, during focus-searching, switches the contact point to the resistor 64 and drops the bias voltage VB to "0" level.

The system control circuit 48 outputs the driving signal of the focus searching, etc., and the servo-control processor (SSP) 66, during focus-searching, drives the drive circuit 26 and moves the position of the object lens sequentially, and at this time, monitors the focus error signal FE and performs the focus searching process. Here, the servo-control processor (SSP) 66 outputs the control signal switching the selection circuit 68 from B side to A side, when the position of "0" level which is the center of "S" letter shape of the focus error signal FE, and at the same time, switches the contact point of the selection circuit 62 to the adjustable resistors 42 or 44 side. Therefore, the focus control operation is started and controlled. With the construction of FIG. 6, during focus-searching, the bias voltage VB is kept to "0" level so as to focus-search certainly.

(4) Other embodiments

Note that the embodiments discussed above have dealt with the case where the focus signal is generated by using a so-called astigmatism method. However, the present invention is not limited to this, but it may also be widely applied to the case where the focus error signal is generated by using various methods for generating the focus error signal.

Further, the embodiments discussed above have dealt with the case where the desired information is recorded and played-back using a compact disc or a magneto-optical disc. However, the present invention is not limited to this but it can be used widely for the optical disc apparatus which uses various disc type recording media.

Furthermore, the embodiments discussed above have dealt with the case where the composite disc has first and second areas. However, the present invention is not limited to this but it can used with discs having a plurality of areas.

Furthermore, the arrangement of the pit area and the groove area is not limited in the present invention.

While there has been described in connection with the preferred embodiments of the invention, it will be obvious to those skilled in the art that various changes and modifications may be made. The invention is claimed, therefore, to cover in the appended claims all such changes and modifications as fall within the true spirit and scope of the invention.

What is claimed is:

1. An optical disc reproduction apparatus for reproducing data from a first type of optical disc on which the data is recorded by pits, a portion of the data recorded on the first type of disc being a first discriminating data, and from a second type of optical disc on which data is recorded by pits in a first region, a portion of the data recorded by pits in the first region of the second type of optical disc being a second discriminating data, and on which data is recorded along a pregroove by a magneto-optical recording method in a second region of the second type of optical disc, the apparatus comprising:

a light receiving means for receiving the reflected light of a light beam irradiated from an optical pick-up to a disc;

a generation means for generating a focus error signal by using the signal supplied from said light receiving means;

a first bias voltage generation means for generating a first non-zero, predetermined, bias voltage;

a second bias voltage generation means for generating a second non-zero, predetermined, bias voltage;

a switching means for selectively providing one of said first and second bias voltages;

a control means for controlling the switching means to provide one of the first and second bias voltages, based on the type of disc, wherein said control means, when the disc is of the second type, controls the switching means from providing one of said first and second bias voltages to providing the other of said first and second bias voltages when the light beam irradiated from the optical pick-up to the disc moves from the first region to the second region and from the second region to the first region;

an adding means for adding the first or second bias voltage provided by the switching means to the focus error signal; and a driving means for driving an object lens of the optical pick-up based on the signal outputted from said adding means.

2. The reproduction apparatus of claim 1, further comprising:

a time constant circuit positioned between said switching means and said adding means.

3. The reproduction apparatus of claim 1, wherein:

said first and second bias voltage generation means each comprises a variable resistor.

* * * * *